3,488,257
METHOD FOR THE PRODUCTION OF INOSINE
Takashi Suzuki, Takarazuka, Tsunetomo Asai, Matsubara, Ikuo Nogami, Kyoto, Michio Katsumata, Kobe, and Masahiko Yoneda, Suita, Japan, assignors to Takeda Chemical Industries, Ltd., Osaka, Japan
No Drawing. Filed May 13, 1966, Ser. No. 549,804
Claims priority, application Japan, May 14, 1965, 40/28,482
Int. Cl. C12b *1/00*; C12k *1/10*
U.S. Cl. 195—28                                 5 Claims

ABSTRACT OF THE DISCLOSURE

The use of a water-insoluble calcium phosphate as a phosphate source in the cultivation of an inosine-producing microorganism results in increased yields of inosine.

---

This invention relates to a method for the cultivation of an inosine-producing microorganism with an insoluble calcium phosphate as a phosphate source in an aqueous culture medium. More particularly, this invention relates to a method for the production of inosine which comprises inoculating a strain of *Bacillus pumilus* Gottheil, on a culture medium containing secondary calcium phosphate, tertiary calcium phosphate or a mixture thereof, incubating the inoculated strain in the culture medium, and recovering accumulated inosine therefrom.

According to the present invention, when a strain of *Bacillus pumilus* Gottheil, which accumulates substantially none of or at best only a limited amount of inosine in a conventional culture medium containing as phosphate source ordinary water-soluble phosphate salts such as potassium dihydrogenphosphate and dipotassium hydrogenphosphate, is incubated in a medium containing water-insoluble calcium salt of phosphoric acid (i.e. secondary calcium phosphate, tertiary calcium phosphate or a mixture thereof) which has never been employed as phosphate source for incubation of a microorganism, a remarkably large or enhanced amount of inosine accumulates in the culture medium.

The object of this invention is to provide a method for the production of inosine, on an industrial scale, with a high yield. This object can be realized by inoculating a strain of *Bacillus pumilus* Gottheil, which is capable of producing inosine in a culture medium containing water-insoluble calcium salt of phosphoric acid, on a culture medium containing secondary calcium phosphate and/or tertiary calcium phosphate, and incubating the inoculated strain in the culture medium. Strains employable in this invention include mutants which are induced from *Bacillus pumilus* Gottheil and require at least adenine for their growth, such as adenine-requiring mutants, adenine- and amino acid-double requiring mutants, adenine- and vitamin-double requiring mutants, and adenine, amino acid- and vitamin-triplicate requiring mutants. These strains can be induced from the wild type microorganisms—*Bacillus pumilus* Gottheil—in per se conventional manner, for example by irradiation with ultraviolet lights or X-rays, or by treatment with nitrogen mustard, nitrous acid, etc. Employment of spontaneously induced strains having the above-mentioned properties from a *Bacillus pumilus* Gottheil microorganism is also within the scope of this invention.

Such strains of *Bacillus pumilus* are, for example, *Bacillus pumilus* Gottheil No. 118 (ATCC No. 19547), No. 138 (ATCC No. 19546), No. 782 (ATCC No. 19548). Throughout the present specification "ATCC No." indicates an accession number of American Type Culture Collection (ATCC), Rockville, Md., U.S.A.

From the viewpoint of industrial production it is generally preferable to carry out the present method with the use of a liquid culture medium, but culture media of other types may also be used. The incubation in the present invention may be carried out either under static conditions or by a submerged process under aeration and/or agitation, employing a culture medium necessarily containing water-insoluble calcium salt of phosphoric acid, i.e. secondary cilcium phosphate and/or tertiary calcium phosphate. The water-insoluble calcium salt of phosphate may be added to the medium as a sole phosphate source or may be used together with the ordinary water-soluble phosphase sources. The optimum concentration of secondary calcium phosphate and/or tertiary calcium phosphate in the culture medium is about 0.2% to about 5.0% (weight/volume), preferably about 0.5% to about 3.0% (weight/volume) from the viewpoint of the yield of inosine to be accumulated in the medium. Desirably, the medium may contain assimilable carbon source(s) and digestible nitrogen source(s). As the assimilable carbon source, one or more materials such as starch, dextrin, sucrose, lactose, maltose, glucose, glycerol, etc. may be used, and various organic materials such as organic ammonium salts, organic nitrates, urea, cornsteep liquor, yeast extract, etc. may be used not only as the carbon source but also as the digestible nitrogen source. With similar effect inorganic nitrogen sources, e.g. inorganic ammonium salts such as ammonium sulfate, ammonium carbonate, ammonium phosphate, or various kinds of nitrates, such as sodium nitrate, potassium nitrate, etc., can also be used. Furthermore, a small quantity of inorganic salts such as sodium chloride, salts of metals, e.g. zinc, iron, manganese, may be added to the medium. Additionally the medium contains other materials necessary for growth of the strain employed, such as adenine source, and may also contain additional growth factors such as amino acid source and/or vitamin source.

Incubation conditions such as the pH value of the medium and the incubation temperature should be controlled so as to accumulate inosine in the maximum amount. Generally, the initial pH of the culture medium and the incubation temperature are respectively adjusted to 5.0–9.0 and to 20–50° C., preferably 28–37° C.

Under the above-mentioned culture conditions, inosine is produced and accumulated in the culture medium as the incubation proceeds.

Incubation is continued until the maximum amount of inosine is accumulated in the culture medium. Although the period required for the maximum accumulation of inosine is changeable depending upon various factors, the amount of inosine in the culture medium generally reaches maximum in from half a day to ten days after the start of the incubation.

Inosine accumulated in the culture medium is recovered either in the free state or in the form of a salt, such as disodium salt or dipotassium salt, by per se conventional and simple procedures, e.g. treatment with activated charcoal or anion exchange resin.

By the method of the present invention, a remarkably enhanced amount of inosine is obtained by incubating in a culture medium containing water-insoluble calcium salt of phosphoric acid, a strain of *Bacillus pumilus* Gottheil which produces only a limited amount of inosine in a conventional culture medium. Even when a strain of *Bacillus pumilus* Gottheil which is unable to produce inosine in a conventional culture medium is employed, a large amount of inosine can be accumulated by incubating it in a culture medium of this invention containing water-insoluble salt of phosphoric acid.

For example, when *Bacillus pumilus* Gottheil No. 138 (ATCC No. 19546) is incubated on culture media containing various amount of secondary calcium phosphate, tertiary calcium phosphate, potassium dihydrogenphosphate and/or dipotassium hydrogenphosphate (glucose 6.0%, dry yeast 1.0%, $(NH_4)_2SO_4$ 1.25%, $MgSO_4 \cdot 7H_2O$ 0.01%, $CaCO_3$ 2.0%) at 30° C. for 96 hours under shaking, amounts of inosine accumulated in the culture broth are as shown in Table I.

TABLE I

| CaHPO$_4$ and/or Ca$_3$(PO$_4$)$_2$ | Concentration of phosphate salts, percent | Amounts of accumulated inosine ($\gamma$/ml.) |  |  |  |  |  |
|---|---|---|---|---|---|---|---|
| | | K$_2$HPO$_4$ and/or KH$_2$PO$_4$ | | | | | |
| | | 0 | K$_2$HPO$_4$, 0.5 | KH$_2$PO$_4$, 0.5 | K$_2$HPO$_4$, 0.4; KH$_2$PO$_4$, 0.6; | KH$_2$PO$_4$, 2.0 | KH$_2$PO$_4$, 3.0 |
| | 0 | Trace | 365 | 529 | 1,263 | 1,024 | 989 |
| CaHPO$_4 \cdot$ 2H$_2$O | 0.5 | 10,752 | 9,899 | 7,689 | 6,997 | 5,291 | 2,130 |
| Ca$_3$(PO$_4$)$_2$ | 1.0 | 12,288 | 11,264 | 10,193 | 8,704 | 6,315 | 5,120 |
| CaHPO$_4 \cdot$ 2H$_2$O | 1.0 | 12,800 | 13,060 | 12,702 | 10,060 | 9,727 | 6,827 |
| Ca$_3$(PO$_4$)$_2$ | 1.0 | | | | | | |
| CaHPO$_4 \cdot$ 2H$_2$O | 3.0 | 10,411 | 10,700 | 11,435 | 9,558 | 8,704 | 5,973 |
| Ca$_3$(PO$_4$)$_2$ | 3.0 | 11,094 | 10,582 | 10,923 | 8,800 | 6,827 | 2,480 |
| CaHPO$_4 \cdot$ 2H$_2$O | 4.0 | 1,291 | 1,300 | 1,109 | 1,024 | 1,092 | 1,126 |
| Ca$_3$(PO$_4$)$_2$ | 4.0 | 2,048 | 2,130 | 2,800 | 1,398 | 1,297 | 1,331 |

According to the method of the present invention, separation of solid portion such as cell bodies from the resultant culture broth is more easily carried out than in a conventional culture medium containing ordinary water-soluble phosphate salt.

The following examples are intended merely to illustrate presently preferred embodiments of this invention and not to restrict the scope thereof.

In the present specification as well as in the following examples, the abbreviations "mg.," "g.," "kg.," and "°C." respectively refer to milligram(s), gram(s), kilogram(s) and degrees centigrade, and percentages are weight/volume unless otherwise described.

Example 1

*Bacillus pumilus* Gottheil No. 118 (ATCC No. 19547) is inoculated on 10 ml. of culture medium containing 6.0% of glucose, 1.0% of dry yeast, 1.25% of $(NH_4)_2SO_4$, 0.01% of $MgSO_4 \cdot 7H_2O$, 2.0% of $CaCO_3$, 20 $\gamma$/ml. of histidine, 0.25% of secondary calcium phosphate and 0.75% of tertiary calcium phosphate, and the culture medium is incubated under shaking at 37° C. for 96 hours, whereby 9,899 $\gamma$/ml. of inosine is accumulated in the culture broth.

When a comparative incubation is carried out under the same conditions as above except that a culture medium containing 0.5% of dipotassium hydrogenphosphate and 0.5% of potassium dihydrogenphosphate instead of secondary calcium phosphate and tertiary calcium phosphate is employed, only about 200 $\gamma$/ml. of inosine is accumulated in the culture broth.

Example 2

Ten liters of seed culture of *Bacillus pumilus* Gottheil No. 118 (ATCC No. 19547) is inoculated on 100 liters of culture medium containing 10.0% of glucose, 1.0% of dry yeast, 1.0% of $(NH_4)_2SO_4$, 0.05% of $MgSO_4 \cdot 7H_2O$, 2.0% of $CaCO_3$, 0.25% of secondary calcium phosphate, 0.75% of tertiary calcium phosphate and 20 $\gamma$/ml. of histidine, followed by incubation under aeration and agitation at 32° C., for 64 hours, whereby 14,300 $\gamma$/ml. of inosine is accumulated. From the culture broth 1.2 kg. of inosine is obtained, e.g. in per se manner with the aid of activated charcoal.

By a comparative incubation under the same conditions as above except that a culture medium containing 0.5% of dipotassium hydrogenphosphate and 0.5% of potassium dihydrogenphosphate instead of secondary calcium phosphate and tertiary calcium phosphate is employed, only about 110 $\gamma$/ml. of inosine is accumulated in the culture broth.

Example 3

Ten liters of seed culture of *Bacillus pumilus* Gottheil No. 138 (ATCC No. 19546) is inoculated on 100 liters of culture medium containing 10.0% of glucose, 1.0% of dry yeast, 1.0% of $(NH_4)_2SO_4$, 0.05% of $MgSO_4 \cdot 7H_2O$, 2.0% of $CaCO_3$, 0.3% of secondary calcium phosphate and 0.3% of tertiary calcium phosphate. After 64 hour-incubation under aeration and agitation at 32° C., 17,800 $\gamma$/ml. of inosine is accumulated in the culture broth. From this culture broth, 1.48 kg. of inosine is obtained, e.g. with the aid of activated charcoal.

By a comparative incubation under the same conditions as above except that a culture medium containing 0.3% of dipotassium hydrogenphosphate and 0.3% of potassium dihydrogenphosphate instead of secondary calcium phosphate and tertiary calcium phosphate is employed, only about 10 $\gamma$/ml. of inosine is accumulated in the culture broth.

Example 4

Ten liters of seed culture of *Bacillus pumilus* Gottheil No. 782 (ATCC No. 19548) is inoculated on 100 liters of a culture medium having the same components as the culture medium employed in Example 3 except containing 10 $\gamma$/ml. of phenylalanine instead of histidine, followed by incubation under aeration and agitation at 34° C. for 76 hours, whereby 17,600 $\gamma$/ml. of inosine is accumulated. From this culture medium 1.46 kg. of inosine is obtained, e.g. with the aid of activated charcoal.

By a comparative incubation employing a medium containing 0.3% of dipotassium hydrogenphosphate and 0.3% of potassium dihydrogenphosphate instead of secondary calcium phosphate and tertiary calcium phosphate, only about 210 $\gamma$/ml. of inosine is accumulated in the culture broth.

Having thus disclosed the invention, what is claimed is:

1. A method for the production of inosine, which comprises inoculating an adenine-requiring strain of *Bacillus pumilus* Gottheil on a culture medium containing water-insoluble calcium salt of phosphoric acid selected from the group consisting of secondary calcium phosphate, tertiary calcium phosphate and mixtures thereof, incubating the said strain in said culture medium in the presence of adenine or adenine-yielding material until inosine is accumulated therein, and recovering the inosine therefrom.

2. A method according to claim 1, wherein the strain is incubated in a culture medium containing about 0.2% to about 5.0% (weight/volume) of the water-insoluble calcium salt of phosphoric acid, under aerobic conditions at a temperature of about 20° C. to about 40° C. and at a pH value of about 6.0 to 9.0.

3. A method according to claim 2, wherein the water-insoluble calcium salt of phosphoric acid is secondary calcium phosphate.

4. A method according to claim 2, wherein the water-insoluble calcium salt of phosphoric acid is tertiary calcium phosphate.

5. A method according to claim 2, wherein the water-insoluble calcium salt of phosphoric acid is a mixture of secondary calcium phosphate and tertiary calcium phosphate.

References Cited

UNITED STATES PATENTS 3,118,820   1/1964   Uchid et al.

OTHER REFERENCES

Journal of American Chemical Society, Vol. 70, p. 4267, 1948.

Journal of Bacteriology, vol. 65, pp. 348–353, 1952.

ALVIN E. TANENHOLTZ, Primary Examiner

U.S. Cl. X.R.

195—100